Patented July 7, 1942

2,289,064

UNITED STATES PATENT OFFICE 2,289,064

INSECTICIDE

Walter C. O'Kane, Durham, N. H.

No Drawing. Application June 25, 1937,
Serial No. 150,263

2 Claims. (Cl. 21—5)

This invention relates to an insecticidal composition of general utility.

There are now available various insecticidal compositions that may be applied for the control of insects in specific situations which arise. For example, it has been proposed and compositions have been prepared for the relatively successful control of flying insects within a room such as flies and mosquitos. These may be sprayed with a solution of the hydrocarbon soluble constituents of pyrethrum flowers in kerosene. Such insecticides, generally referred to as fly sprays, act first to paralyze the insect and if a sufficient amount of the active toxicant has been deposited on a particular insect the effect is lethal.

Other types of insecticides are used for the control of that class of insects generally referred to as clothes moths which include not only clothes moths but various types of beetles whose larvae feed upon animal products including wool, hair, feathers and the like used for clothing or home decorations. In this case control of the moths has been heretofore by two principal methods. First, fumigation by exposing articles subject to moths to lethal concentrations of gaseous insecticides or solid insecticides which volatilize at normal temperatures and second by the application of a liquid insecticide to the insects which are feeding on articles to be protected and in recent time a third method which includes treatment of fabrics, etc., either before they are made up into garments, upholstery covers and the like or after they are made up to render the animal products therein repellant, undesirable or unfit as a food for the larvae.

Mothproofing may be considered from two points of view. First killing whatever live insects or eggs that may be present on an article and second making that article unfit for food. The latter is usually considered sufficient although infestation of untreated articles is likely to appear when the mothproofing is effective only in this manner.

A third form of insecticide is used to control insects on plants, shrubbery and other living hosts. The particular problem arising here is in providing a composition which can be uniformly applied to infested areas at a concentration sufficient to destroy the insects but at the same time will not damage the host.

Insecticides which could be used for one of the several purposes above described have been produced but no composition has been provided which can be successfully and safely used in all of the circumstances and for all of the purposes above described.

I have discovered a composition which comprises, for purpose of general application, three basic ingredients that can be successfully used as an insecticide for the several purposes enumerated. This basic composition while comprising three principal ingredients may have mixtures of two or more compounds that serve a similar purpose in which case the mixture as a whole would be considered one of the basic ingredients or components.

The principal ingredient considered from the standpoint of amount is a liquid that serves as a solvent. To be successful in my novel composition it must have certain well defined properties. For example, if the insecticide forming the subject matter of this invention is to be used as a fly spray the solvent must be substantially colorless in order not to stain draperies, curtains, walls and the like and volatile enough to dry or disappear readily without leaving any trace of residue. When vaporized in a room it must be non-explosive to insure safety and of course should be an effective carrier for the toxicant hereinafter described to enable the toxicant to kill the insects. In addition it must not be an effective solvent for the usual coating materials on furniture, walls, woodwork and the like under the conditions which obtain in spraying the insecticide freely in a room.

To be useful in the moth proofing function, the above requirements must be satisfied and the liquid should have no harmful effects on dyes.

While the properties above set forth are desirable when the insecticide is used as a plant spray they are not essential except in so far as the toxicant must be effectively carried thereby but particularly important for this purpose is a solvent liquid which when dispersed in water and sprayed on plants will not have serious effects in damaging the leaves, shrubs or flowers.

A liquid that satisfies the above requirements is a highly refined petroleum derivative within the low boiling range embracing kerosenes but which must be substantially water white and have a relatively small sulfonatable content (unsaturates) or conversely a high sulfonation value. Other liquids that may be employed include ethyl alcohol, isopropyl alcohol and the like although these latter examples may be somewhat less desirable in the composition. Carbon tetrachloride may comprise the solvent where the toxicant is soluble therein.

This component will be hereinafter referred to as the solvent, which is a low boiling, volatile, colorless, substantially saturated organic liquid.

The second component of the insecticidal composition is the substantially water insoluble toxicant or the lethal agent which when contacted with the insect kills the insect or when applied to its food makes that food repellant, undesirable or unfit as a food for insects.

The toxicant to be useful when the composition is employed as a fly spray must first be capable of producing a quick knockdown or paralysis of the insects reached by the spray and furthermore should thereafter be lethally toxic to the insects commonly found in households including flies, mosquitos roaches, bedbugs, etc. in order that the original effect of the paralysis will not wear off and permit the insect to revive. Particularly important is the requirement that the toxicant when freely sprayed in a closed space, such as a room, should have no harmful effect on human beings and a freedom from disagreeable odor. As in the case of the solvent, it should not cause staining of curtains, draperies, walls and the like when deposited thereon in very minute amounts as will occur by evaporation of the solvent.

For mothproofing, the toxicant preferably has all of the properties above outlined although the actual killing of the insects is not essential but is desirable in that those insects which are killed will not be able to infest untreated articles. In addition, a toxicant in a mothproofing composition must not affect the dyes and should be free from harmful effects such as stiffening, etc. on woolens. The most important factor for a mothproofing toxicant is its ability to render sprayed woolens and other animal products repellant to attack by clothes moths, carpet beetles, buffalo bugs and the like which effect must persist over an extended period of time whether the articles are freely exposed to the air and desirably even where they are dry cleaned or washed.

A very high toxicity is required of a toxicant employed for a plant spray when the insecticide is highly diluted as a dispersion in water and sprayed on the plants yet with its high toxicity it must still not have harmful effects on the user.

Among the toxicants which may be included in my insecticide composition as the lethal or paralyzing agent are those within the group comprising thiocyanates, with one or more negative elements or groups such as oxygen, sulphur, iodine attached to the thiocyanate group. Specific examples of these include: thiocyano acetone, amyl thiocyanacetate, cyclohexyl thiocyanacetate, sec-octyl thiocyanacetate, beta-ethoxyethyl thiocyanacetate, amyl beta-thiocyanopropionate, butyl beta-thiocyanopropionate, cyclohexyl beta-thiocyanopropionate, sec-octyl beta-thiocyanopropionate, beta-ethoxyethyl beta-thiocyanopropionate, beta-thiocyanoethyl ethyl ether, beta-thiocyanoethyl butyl ether, the beta-thiocyano derivatives of the mono-alkyl ethers of diethylene glycol, in which the alkyl group may be any aliphatic group of comparatively low molecular weight, e. g., methyl, ethyl, propyl, butyl, etc. Extensive tests have been made using the thiocyanate of the mono-butyl ether of diethylene glycol or beta-butoxy-beta prime-thiocyano-diethylether. These and other insecticidal thiocyanates including generically organic thiocyanates either aliphatic or aromatic can be used. Various specific derivatives of these thiocyanates may have one or more undesirable properties and not come within all of the requirements above set forth. Obviously, such toxicants should be avoided.

Extensive tests within my insecticidal composition forming the subject matter of this invention, have also been made using as the toxicant substituted guanidines particularly the di-aryl substitution products, of these the fatty acid (oleic) salt of di-xylyl guanidine is particularly successful.

Another toxicant is the extract obtained from cubé with a chlorinated hydrocarbon. The extract is effective both for moth proofing and as a contact insecticide but may be unstable in the presence of sunlight and therefore does not give extended protection or effectiveness under all conditions.

Other toxicants that have been successfully used in the composition and give good performances as moth proofing agents including dibutyl phthalate in from two to ten percent of the amount of the solvent, dibutyl aniline in similar proportions and benzyl cyclo hexyl amine as well as phenol cyclo hexyl amine used in similar proportions.

The amount of toxicant may vary according to the properties of the one selected from a few percent of the solvent to as high as fifteen or twenty percent.

Hereinafter the component just disclosed and of which numerous examples have been given is referred to as the toxicant, which is highly toxic to insects, persistent, yet not harmful to plants or human beings under the conditions of use.

Compositions of the two ingredients the solvent and the toxicant, above discussed in detail, provide a fly spray or direct application moth proofer but cannot be applied to plants. Their effectiveness for the first two purposes is substantially increased and in addition the plant spray property is obtained by the addition of the third component. The third component is subject to the same restrictions where the product is to be used as a fly spray as were set forth in discussing the solvent and toxicant. Specifically, in the combination it should be non-toxic to the user and free from odors, residue or staining effects and not increase the fire hazard. It has been found that this component increases the effectiveness of the toxicant in paralyzing and killing insects exposed to the spray.

Considered from the moth proofing point of view in addition to the properties just mentioned, it should increase the moth proofing effect of the composition when sprayed on garments. A further result of the addition of the third component is that it makes possible the moth proofing of woolens and the like by immersing the fabrics in a water dispersion of the insecticidal composition.

In addition to improving the properties of the composition as a fly spray and moth proofer, the third component enables the composition to be dispersed in water and sprayed on plants in concentrations which will effectively control insects harbored on the plant yet will not damage the foliage. This third component must of course be harmless to plants in the necessary concentrations for effective insect control and should increase the effectiveness of the two component composition as an insecticide when sprayed on plants. In all cases the third component must be soluble in the solvent in concentrations sufficient to perform the function of dispersing the entire composition in water.

A number of emulsifying or dispersing agents have been successfully employed including "diglycol oleate" and "diglycol laurate" in concentrations approximating 5% of the solvent. Several commercial emulsifying agents have proven even more successful than the pure compounds. For example, Emulphor O, a commercial product manufactured under the Schoeller et al., United States Patent Number 1,970,578, and Emulphor E. L. give excellent results in concentrations not exceeding 5% of the solvent.

This third component having the properties above set forth is referred to generally as the dispersing agent, or emulsifying agent.

My new composition comprising substantially anhydrous ingredients selected from the examples given above or equivalent materials is a superior fly spray over the commercial fly sprays heretofore prepared comprising, for example, extract of pyrethrum in kerosene. This has been established in tests made on common house flies under carefully controlled conditions with a standard Peet-Grady test apparatus. The tests also showed that the addition of the dispersing agent to the two component insecticide from foregoing examples resulted in substantial improvement in effectiveness.

In a practical test in a cellar approximately 60' by 60' several thousand mosquitos, *Culex pipiens*, were sprayed with one pint of a composition comprising 4% of the thiocyanate of the mono-butyl ether of diethylene glycol and less than .5% Emulphor O in a highly refined kerosene. The mosquitos were all rapidly knocked down and at the end of twenty-four hours none had recovered and all were apparently dead. The same composition when sprayed on the cluster fly, *Pollenia rudis*, in an attic about rafters and windows gave control.

A piano had been badly damaged by clothes moths having eaten the felts. The felts were freely sprayed with the above mentioned composition. Although a heavy coating of the spray hit on the varnish of the piano no damage resulted and after several months no further infestation of the felts was observed.

A large number of tests in which compositions similar to that just described, with the toxicant present in an amount equal to 4% of the solvent, were run to test the moth proofing qualities of the insecticidal composition with dispersions in water and in which the time of exposure as well as the temperature were varied. It was found that treatments for as short as one hour with 10% concentrations in water at approximately 75° Fahrenheit protect woolens for about a week against larvae placed directly thereon but that after several weeks the larvae began to feed. Increasing the concentration to 20% made some improvement. Raising the temperature to 100° to 110° Fahrenheit in another series of tests comparable to those just discussed did not appreciably affect the results. However, when the dispersion was kept at 140° to 150° Fahrenheit and the cloth immersed for as little as one-half hour the results obtained were far superior even with a concentration as low as 5%. A 20% dispersion at 140° to 150° Fahrenheit was effective to moth proof woolens subjected thereto for a period of about one hour. At the end of six weeks practically all of the original larvae which had been applied to the treated and dried woolens were dead and those added at the end of twenty days were in most instances all killed and there was no feeding. The larvae employed in these tests were those of the black carpet beetle, *Attagenus piceus*, a hardy variety.

The foregoing specific composition with 3% of toxicant was used in a large scale test to clean up an infestation of the webbing clothes moth and buffalo bug, *Tineola biseliella* and *Anthranus scrophalariae*, which are commonly found in most any household. The infestation was not heavy anywhere although several garments were found which had several clothes moth larvae feeding upon them. The buffalo bugs were found frequently during cleaning and a few moths were noticed flying about in closets. The treatment was carried out as follows: The "den" where the buffalo bugs were most frequently encountered was sprayed with a vacuum cleaner spray attachment, care being taken to hit all cracks in the floor and the lower wall. The rug was mothproofed by spraying with one and one-half quarts of the three component insecticide. The closet in the room was thoroughly sprayed, the clothing being removed and returned about an hour after spraying. A large closet in the hall was sprayed with all of the clothing left hanging in it during the process. Three-quarters of a pint of the mothproofer was vaporized above and below the clothing, but they were not sprayed directly. The corners and cracks of the closet were thoroughly sprayed. Two other closets were sprayed in the absence of garments, these were returned and the mothproofer was sprayed above the garments, about one-half pint of the mothproofer being vaporized in each closet.

The garments sprayed were: a pair of ski trousers and of slacks, each having several clothes moth larvae feeding on them; two dressing robes, both of which had been eaten, but which bore no larvae; a knit dress and a riding coat, both valuable and which had not been attacked. Approximately one-half pint of the mothproofer was used for each of the mentioned garments, a little more being used on the ski trousers and somewhat less on the light dressing robes.

A careful inspection made at the end of four months showed that the infestation was completely cleared up.

Dispersions of the three component composition were made at concentrations of from 1% to 3% in tap water and applied to rose aphid, *Macrosiphum rosae*, on rose twigs; black bean aphid, *Aphis rumicis* on nasturtium and on lambs quarter; willow leaf beetle larvae, *Plagiodera versicolora*, on willow; aphid, *Macrosiphum rudbeckiae*, on wild lettuce; pine bark aphid, *Chemes pinicorticis*, on pine; red spider eggs, *Tetranychus telarius*, on bean; citrus mealybug, *Pseudococcus citri*, on calla lily; spinach aphid, *Myzus persicae*, on geranium, with kills ranging from 95% to 100% on counts taken, in the case of insects, after twenty-four hours, or in the case of eggs, at the end of several weeks. Numerous other tests have been made to determine effectiveness and plant injury but in concentrations up to 4% there was no injury except in isolated cases a slight injury to very delicate plants. In no case was the injury sufficient to cause any concern.

This composition provides a material which can be used to satisfy all of the requirements for insect control in homes or small gardens with maximum effectiveness yet free from danger, inflammability, staining, fading, plant injury, etc., as set forth in detail above.

What is claimed is:

1. The method for mothproofing woolens against insect pests which comprises forming an insecticidal composition comprising as a carrier for the toxicant a low boiling colorless volatile organic liquid, an organic thiocyanate toxicant, and a dispersing agent soluble in said liquid which will emulsify the composition in water, dispersing from 4 to 20% of said composition as an emulsion in water, subjecting woolens to be protected to the emulsion while maintaining the emulsion at a temperature of above about 140° F. and drying the treated woolens.

2. The method for mothproofing woolens against insect pests which comprises forming an insecticidal composition comprising as a carrier for the toxicant a highly refined low boiling volatile mineral oil hydrocarbon liquid up to 15 per cent of a persistent organic thiocyanate toxicant, and a dispersing agent soluble in said liquid which will emulsify the composition in water, dispersing from 4 to 20% of said composition as an emulsion in water, subjecting woolens to be protected to the emulsion while maintaining the emulsion at a temperature of above about 140° F. and drying the treated woolens.

WALTER C. O'KANE.